(12) United States Patent
Oowada

(10) Patent No.: US 6,307,537 B1
(45) Date of Patent: Oct. 23, 2001

(54) MULTIFUNCTION KEY FOR USE WITH PORTABLE DEVICE

(75) Inventor: Yasuhiko Oowada, Hokkaido (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/359,212

(22) Filed: Jul. 22, 1999

(30) Foreign Application Priority Data

Jul. 23, 1998 (JP) .................................................. 10-207895

(51) Int. Cl.⁷ .................................................. G09G 5/08
(52) U.S. Cl. .......................................... 345/160; 345/169
(58) Field of Search .................................... 345/157, 159, 345/160, 161, 163, 167, 168, 169, 172; 341/22, 23, 28

(56) References Cited

U.S. PATENT DOCUMENTS

| | | | |
|---|---|---|---|
| 5,252,952 | * 10/1993 | Frank et al. | 345/157 |
| 5,404,152 | * 4/1995 | Nagai | 345/157 |
| 5,504,502 | * 4/1996 | Arita et al. | 345/160 |
| 5,543,592 | * 8/1996 | Gaultier et al. | 345/161 |

FOREIGN PATENT DOCUMENTS

| | | |
|---|---|---|
| 0540147 | * 5/1993 | (EP) . |
| 4-21035 | 2/1992 | (JP) . |
| 6-9024 | 2/1994 | (JP) . |
| 6-331873 | 12/1994 | (JP) . |
| 7-245042 | 9/1995 | (JP) . |
| 8-6714 | 1/1996 | (JP) . |

* cited by examiner

*Primary Examiner*—Regina Liang
(74) *Attorney, Agent, or Firm*—Schulte Roth & Zabel LLP; Joel E. Lutzker; Donna Angotti

(57) ABSTRACT

Multifunction key switch in which a multifunction key 6 is fitted into a hole 4 formed in a front case 3 so as to be able to pivotally move in a thicknesswise direction of the front case 3, as well as to enter a plurality of different operation instructions. A hole 8 is formed so as to penetrate through the multifunction key actuation section 6 in the thicknesswise direction of the front case 3. An execution key actuation section 7 is fitted into the hole 8 and determines the operation instruction entered by way of the multifunction key actuation section 6 when being pressed in the thicknesswise direction of the front case 3.

6 Claims, 11 Drawing Sheets

MULTIFUNCTION KEY FOR USE WITH PORTABLE DEVICE

BACKGROUND OF THE INVENTION

The present invention relates to a multifunction key for use with a portable device, such as a mobile telephone, a portable CD or MD player, or a portable game machine, which prevents simultaneous pressing of keys, to thereby improve operability.

In order to improve the operability of a portable device, such as a portable telephone, a cordless telephone, a portable CD or MD player, or portable game, or a like, a single key is employed so as to enable the user to issue a plurality of operation instructions by actuation of a single key. Such a single key is called a multifunction key, and examples of a conventional multifunction key are shown in FIGS. 17 and 18.

A multifunction key "a" shown in FIG. 17 enables entry of six different operation instructions; i.e., an up instruction, a down instruction, a left instruction, a right instruction, a call instruction, and a function (F) instruction, by actuation of a single multifunction key.

The call instruction and the function (F) instruction are performed by pressing the multifunction key "a" for a relatively longer period of time.

A multifunction key "b" shown in FIG. 18 is arranged so as to be enable the user to input four different operation instructions; i.e., an up instruction, a down instruction, a left instruction, and a right instruction, by actuation of a single multifunction key.

Each of the multifunction keys "a" and "b" shown in FIGS. 17 and 18 enables entry of a plurality of different operation instructions. A plurality of operation instructions can be issued by actuation of only a single multifunction key, thus improving operability of a portable device.

However, the multifunction keys "a" and "b" shown in FIGS. 17 and 18 suffer the following problems.

In order to execute the operation instruction entered by means of the multifunction key "a" or "b"; for example, a call origination instruction or a re-dialing instruction, another key spaced apart from the multifunction key "a" or "b" must be actuated by use of a finger. Thus, a key other than the multifunction key "a" or "b" must be actuated every time an operation instruction is to be issued, thus deteriorating the operability of the portable device.

In association with a reduction in the size and weight of the portable devices, the multifunction keys "a" and "b" themselves have become smaller. When the small-sized multifunction key "a" or "b" is actuated so as to select one from the operation instructions assigned to the multifunction key, an undesired operation instruction may also be selected and actuated in addition to a predetermined operation instruction by two-stage pressing action.

SUMMARY OF THE INVENTION

The present invention has been conceived in view of the foregoing problem, and the object of the present invention is to provide a multifunction key for use with a portable device which enables the user to select an operation instruction and execute (i.e., determine) the thus-selected operation instruction without involvement of release of a finger from a single multifunction key and which prevents a faulty operation, which would otherwise be caused by selection of an unintended operation instruction through two-stage pressing action, thus ensuring superior operability.

Accordingly, the present invention provides a multifunction key for use with a portable device comprising: a case having a hole formed therein; a multifunction key actuation section which is fitted into the hole and can be pivotally moved in a thicknesswise direction of the case, to thereby input a plurality of different operation instructions; another hole formed so as to penetrate through the multifunction key actuation section in the thicknesswise direction of the case; and an execution key actuation section which is fitted into the latter hole and determines the operation instruction entered by way of the multifunction key actuation section when being pressed in the thicknesswise direction of the case.

Preferably, projecting faulty-operation prevention members are formed at respective areas where support pins for pivotally supporting the multifunction key actuation section are provided, and when the execution key actuation section is pressed in the thicknesswise direction of the case, the faulty-operation prevention members prevent the multifunction key actuation section from being pressed in the thicknesswise direction of the case.

Preferably, a tapered section is formed in the multifunction key actuation section into which the execution key actuation section is fitted, to thereby prevent the user's finger from touching the multifunction key actuation section during the course of actuation of the execution key actuation section.

Preferably, pressing force required for actuation of a metal dome by way of a rubber key when the execution key actuation section is pressed in the thicknesswise direction of the case is set so as to be greater than pressing force required for actuation of metal domes by way of the rubber key when the multifunction key actuation section is pressed in the thicknesswise direction of the case.

Therefore, the multifunction key for use with a portable device according to the present invention eliminates a necessity for actuating another key spaced apart from the multifunction key in order to execute an operation instruction and can prevent a faulty operation, thus yielding an advantage of improved operability of the portable device.

DETAILED DESCRIPTION OF THE PREFERRED EMBODIMENTS

An embodiment of the present invention will now be described by reference to accompanying drawings.

FIGS. 1 through 16 show one example of a portable cellular phone equipped with a multifunction key according to an embodiment of the present invention.

Figure 15:
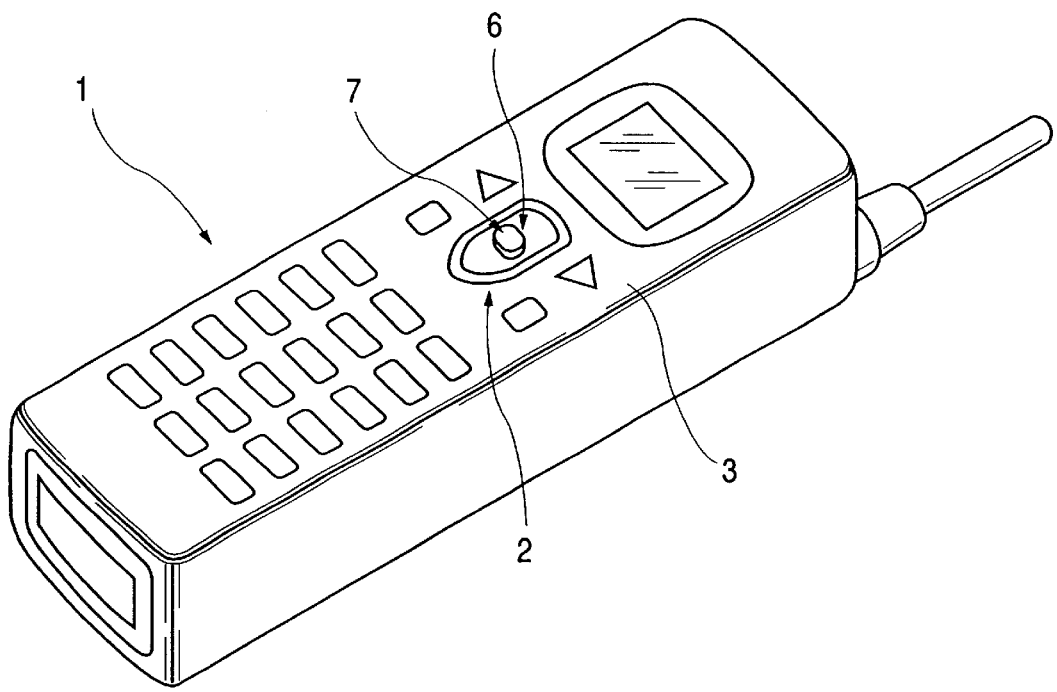
FIG. 15 is a perspective view showing one example in which the multifunction key according to the present invention is applied to a portable device, i.e., a portable cellular phone.

FIG. 15 shows one example of a portable cellular phone equipped with a multifunction key according to the present invention. In the drawing, reference numeral 1 designates a portable cellular phone; and 2 designates a multifunction key provided in a front case 3 of the portable cellular phone.

Figure 16:
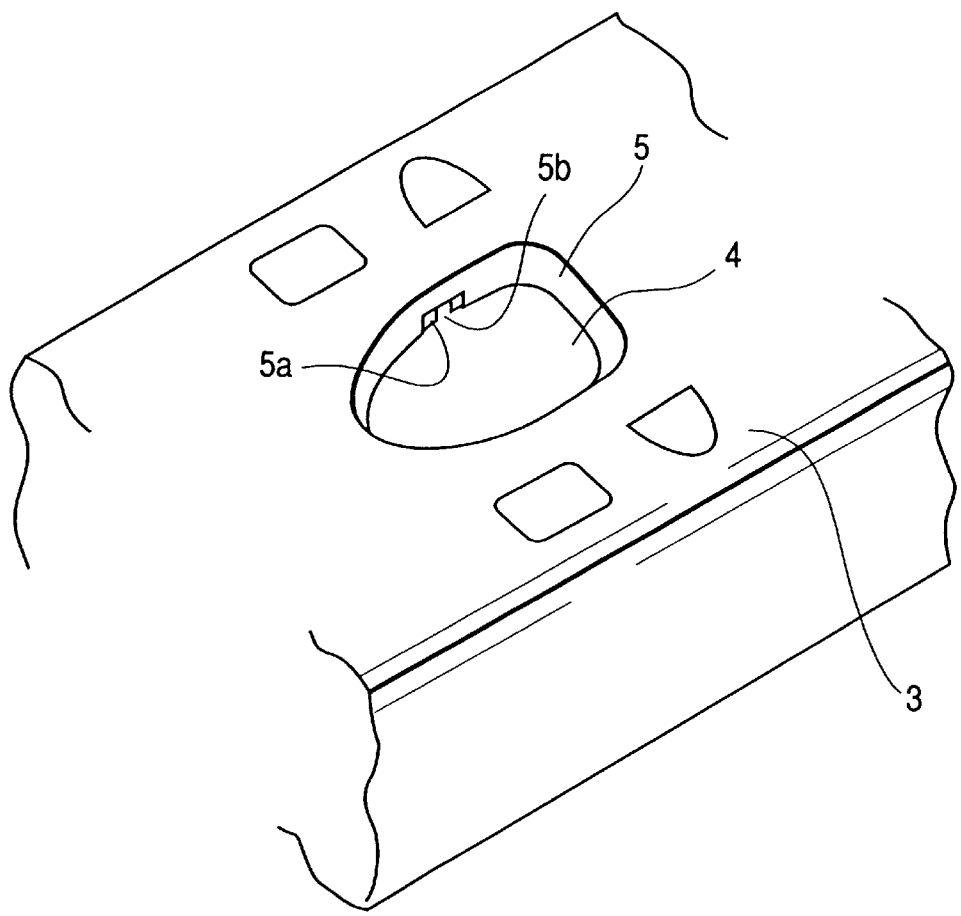
FIG. 16 is a perspective view showing a hole formed in a front case of the portable cellular phone shown in FIG. 15, wherein the hole is used for fittingly receiving a multifunction key actuation section employed in the present invention.
Figure 17:
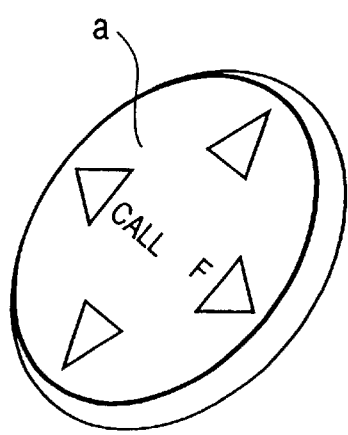
FIG. 17 is a perspective view showing one example of a conventional multifunction key.
Figure 18:
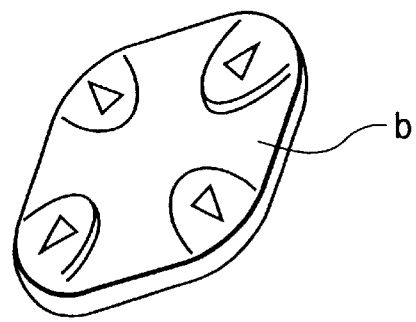
FIG. 18 is a perspective view showing another example of a conventional multifunction key.

As shown in FIG. 16, a hole 4 which fits the multifunction key 2 is formed in an area on the front case 3 where the multifunction key 2 is to be formed.

Figure 5:
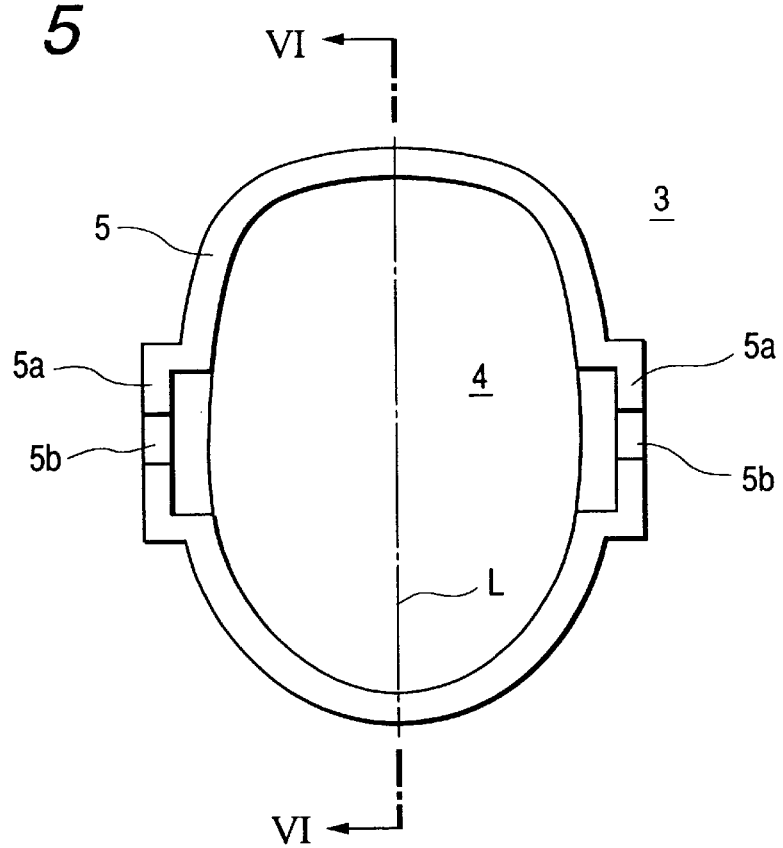
FIG. 5 is a plan view showing a hole formed in a front case for fittingly receiving a multifunction key actuation section employed in the present invention.
Figure 6:
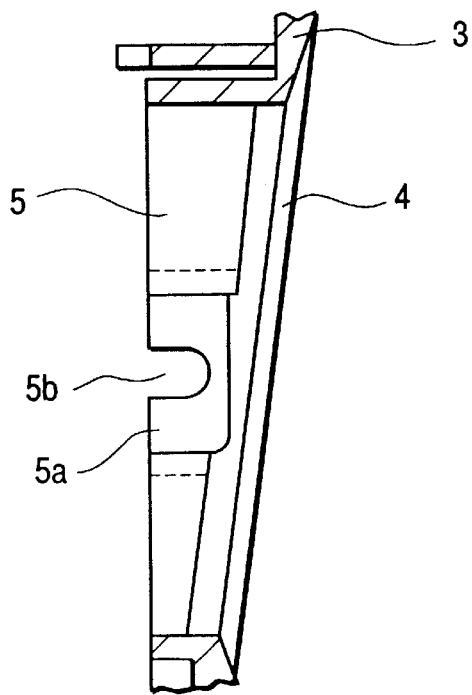
FIG. 6 is a cross-sectional view of the multifunction key actuation section taken along line VI—VI shown in FIG. 5.

The hole 4 has a substantially oval shape when viewed from the top, and a rib 5 is formed along the entire periphery of the hole 4, as shown in detail in FIGS. 5 and 6. The rib 5 protrudes to a required height toward the inside of the front case 3 and also has a required thickness in a direction substantially parallel to the surface of the front case 3.

As shown in FIG. 5, of the rib 5 formed along the periphery of the hole 4, rib segments (hereinafter referred to as "protruding segments") protrude outward along a lateral axis so as to slightly depart from the periphery of the hole 4 and are substantially symmetrical with respect to a longitudinal axis L of the hole 4. The opposing surfaces of the protruding segments are formed into vertical surfaces 5a parallel to the longitudinal axis L. A U-shaped pin support hole 5b is formed in each of the vertical surface 5a so as to pass through the vertical surface 5a of the rib 5 in a thicknesswise direction (see FIGS. 5, 6, and 16).

The multifunction key 2 to be fitted into the hole 4 of the front case 3 has a multifunction key actuation section 6 for entering a plurality of different operation instructions, and an execution key operation section 7 for determination and redialing purposes (see FIGS. 1, 2, 3, 4, and 15).

Figure 7:
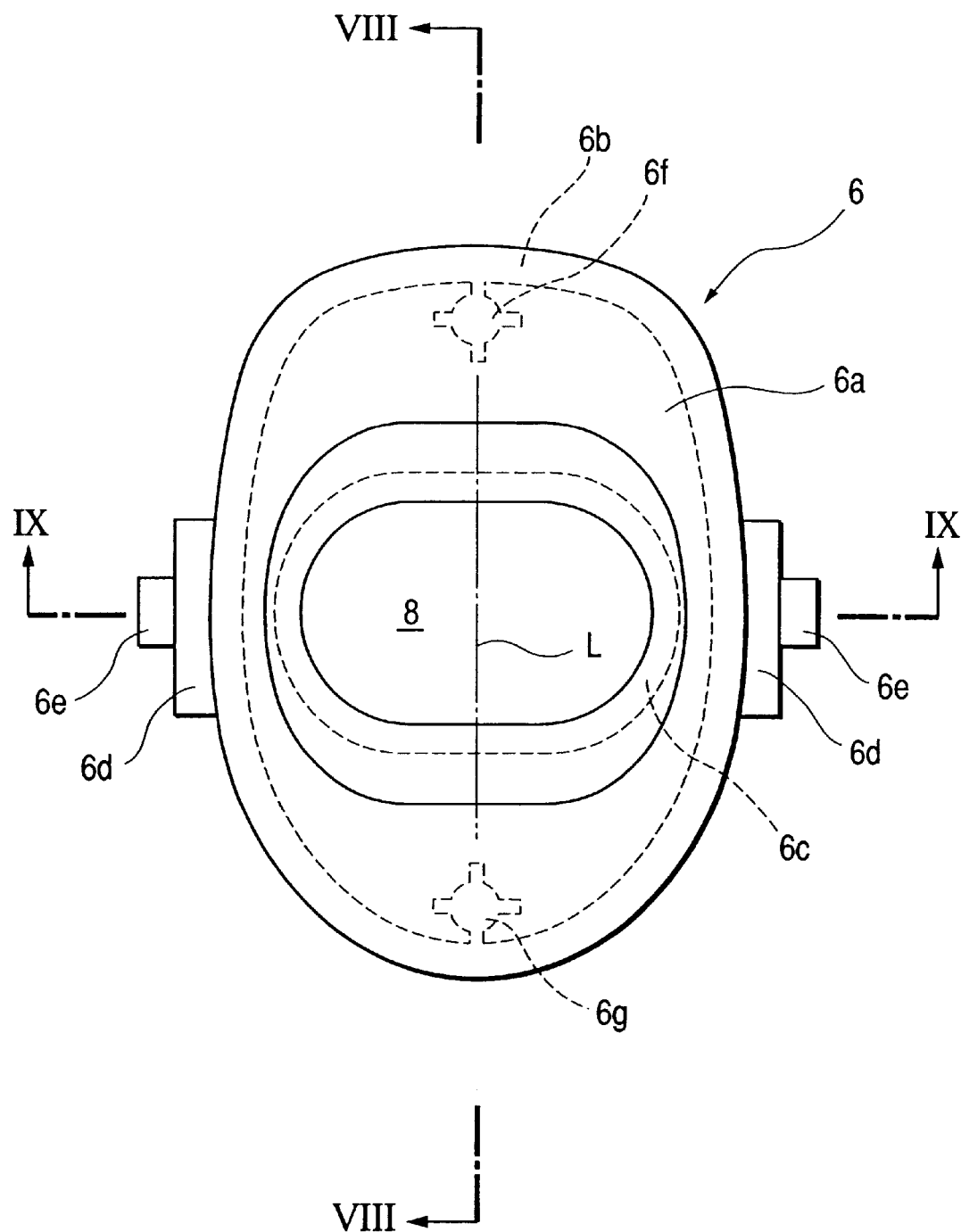
FIG. 7 is a plan view showing a multifunction key actuation section employed in the present invention.
Figure 8:
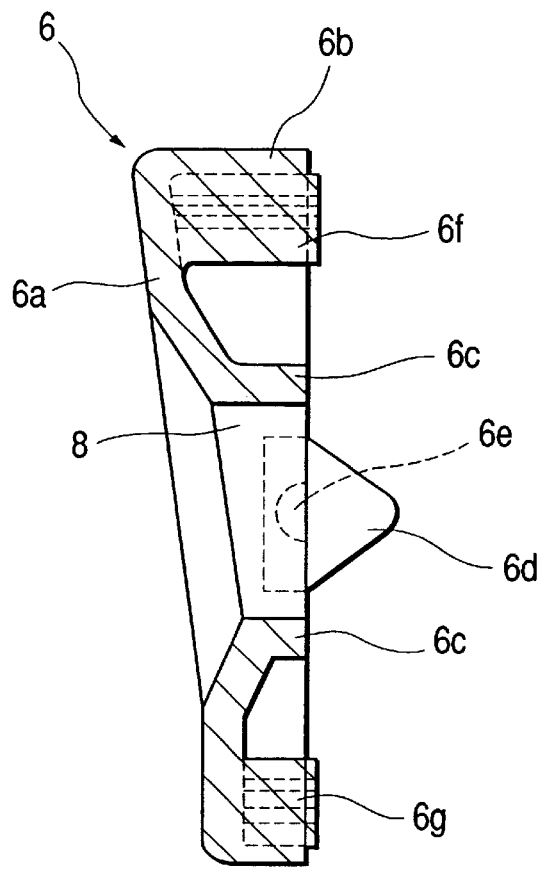
FIG. 8 is a cross-sectional view of the multifunction key actuation section taken along line VIII—VIII shown in FIG. 7.
Figure 9:
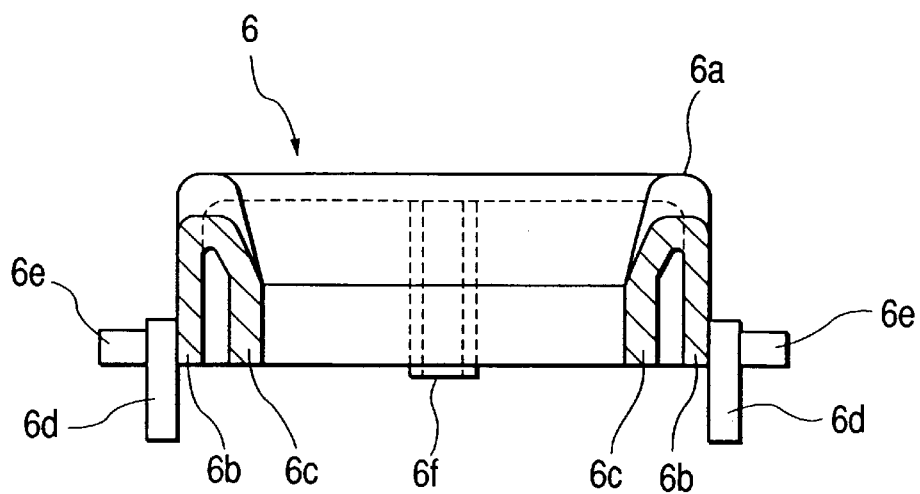
FIG. 9 is a cross-sectional view of the multifunction key actuation section taken along line IX—IX shown in FIG. 7.

Details of the multifunction key 6 are shown in FIGS. 7 through 9. The multifunction key actuation section 6 has an oval section 6a which is formed into a substantially-oval shape and has a required thickness, such that the multifunction key actuation section 6 fits into the hole 4 of the front case 3 with a slight clearance ensured therebetween (see FIGS. 1, 4, and 16), when viewed from top. In substantially a center position along the longitudinal axis L of the oval section 6a, a substantially oblong hole 8 for fittingly receiving the execution key actuation section 7 is formed in the thicknesswise direction of the oval section 6a. The hole 8 is symmetrical with respect to the longitudinal axis L and is oblong, with its long axis disposed along the lateral axis of the hole 4.

A rib 6b having a required thickness is formed to a required height along the entire outer periphery of the oval section 6a, and a rib 6c having a required thickness is formed to a required height along the entire inner periphery of the hole 8 formed in the oval section 6a (FIGS. 8 and 9). The upper surface of the oval section 6a is tapered down toward the hole 8 along the longitudinal axis L of the oval section 6a (see FIG. 8).

In respective lateral positions on the outer side surface of the rib 6b which are aligned along the lateral axis and are opposite each other with reference to the longitudinal axis L of the oval section 6a, circular-arch faulty-operation prevention members 6d having a required radius of curvature are formed integrally with the rib 6b. The faulty-operation prevention member 6d is formed so as to protrude downward from the lower end surface of the ribs 6b and 6c, as well as to assume the shape of a wedge (see FIGS. 3, 7, 8, and 9).

A support pin 6e is integrally formed with the outer side surface of each of the faulty-operation prevention members 6d so as to protrude horizontally outward. The support pin 6e is formed into a semi-circular shape, whose flat end is located in substantially the same plane as the lower end surface of the ribs 6b and 6c (see FIGS. 8 and 9).

On the lower surface of the oval section 6a at respective ends of the longitudinal axis L of the multifunction key operation section 6, rubber key actuation members 6f and 6g are formed integrally with the oval section 6a and the rib 6b such that the longitudinal axis L runs through the rubber key actuation members 6f and 6g when viewed from the top (see FIGS. 7, 8, and 9). The rubber key actuation members 6f and 6f protrude slightly downward from the lower end surface of the ribs 6b and 6c to positions short of the tip end of each of the faulty-operation prevention members 6d (see FIGS. 8 and 9).

Figure 10:
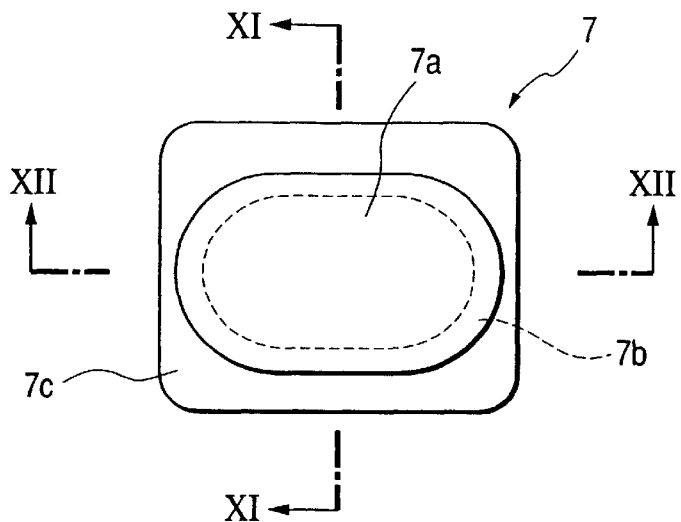
FIG. 10 is a plan view showing an execution key actuation section employed in the present invention.
Figure 11:
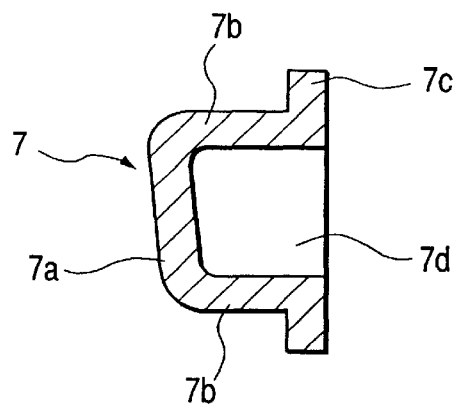
FIG. 11 is a cross-sectional view of the execution key actuation section taken along line XI—XI shown in FIG. 10.
Figure 12:
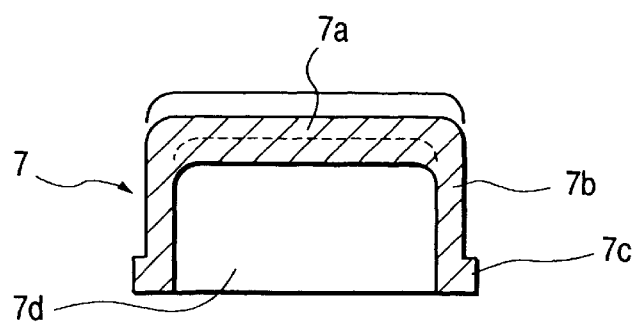
FIG. 12 is a cross-sectional view of the execution key actuation section taken along line XII—XII shown in FIG. 10.

The execution key actuation section 7 is shown in detail in FIGS. 10 through 12. When viewed from the top, the execution key actuation section 7 is fitted into the hole 8 formed in the oval section 6a of the multifunction key actuation section 6 with a slight clearance formed therebetween (see FIGS. 7 and 8). To this end, the execution key actuation section 7 has a substantially oblong section 7a of a required thickness.

A rib 7b having a required thickness is formed integrally with the oblong section 7a to a required height along the outer periphery of the oblong section 7a. A flange 7c having a required thickness is integrally formed with the lower end of the rib 7b so as to surround the rib 7b in the peripheral direction of the oblong section 7a.

A switch sheet 13 having electrodes 10, 11, and 12 formed thereon is placed on top of a substrate 9 which supports the front case 3. A switch sheet 17 having electrodes 14, 15, and 16 formed thereon is placed above the switch sheet 13 such that the electrodes 10, 11, and 12 come into electrical contact with the electrodes 14, 15, and 16, respectively (see FIG. 2).

Meal domes 18, 19, and 20, each having a parabolic cross section, are placed on the switch sheet 17 such that the metal dome 18 is situated so as to face the electrodes 10 and 14, the metal dome 19 is situated so as to face the electrodes 11 and 15, and the metal dome 20 is situated so as to face the electrodes 12 and 16. The metal domes 18, 19, and 20 can be pressed by means of a press sheet 21 while the top of each of the metal domes 18, 19, and 20 protrudes upward (toward the front case 3). The metal domes 18 and 19 are actuated under substantially the same pressing force, but the metal dome 20 is actuated under a pressing force greater than that under which the metal domes 18 and 19 are actuated. To this end, for example, the metal dome 20 is imparted with rigidity greater than that imparted to the metal domes 18 and 19.

A rubber key 22 is placed on the metal domes 18, 19, and 20 and is formed into a rectangular shape when viewed from the top. Protuberances 23a, 23b, and 23c are formed on the lower surface of the rubber key 22 such that the protuberance 23a faces the top of the metal dome 18, the protuberance 23b faces the top of the metal dome 19, and the protuberance 23c faces the top of the metal dome 20. Further, protuberances 24a, 24b, and 24c are formed on the upper surface of the rubber key 22 such that the protuberance 24a opposes the protuberance 23a, the protuberance 24b opposes the protuberance 23b, and the protuberance 24c opposes the protuberance 23c (see FIGS. 2, 4, 13, and 14). The protuberance 24c is formed so as to protrude higher than do the other protuberances 24a and 24b.

Figure 4:
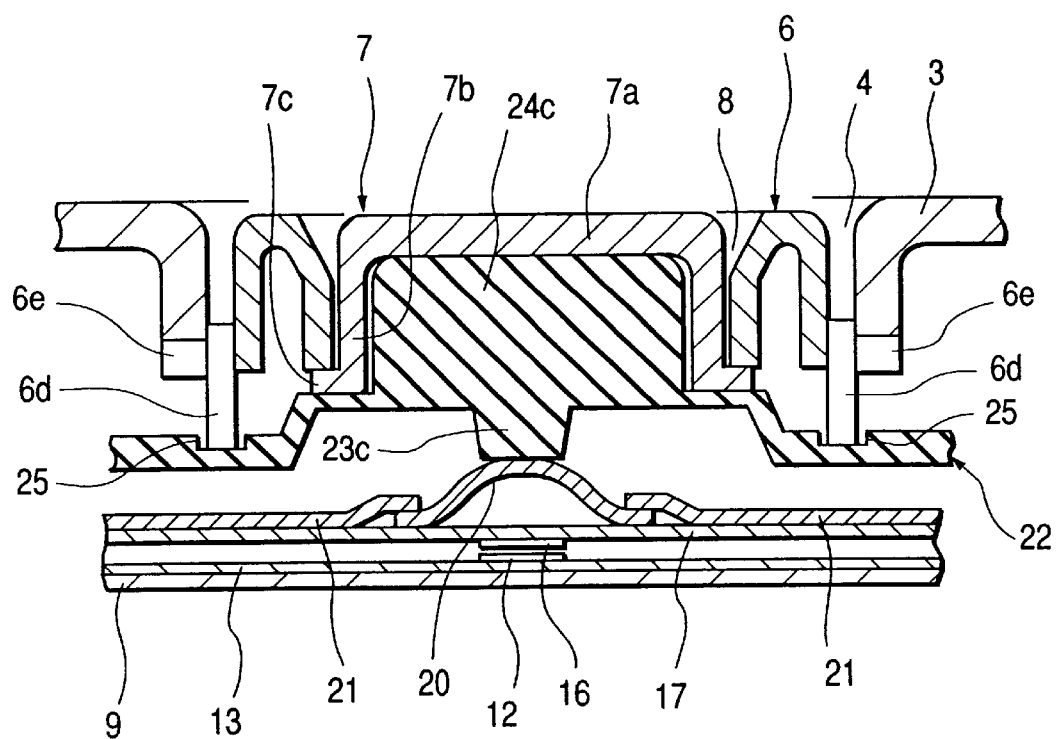
FIG. 4 is a cross-sectional view of the multifunction key taken along line IV—IV shown in FIG. 1.
Figure 13:
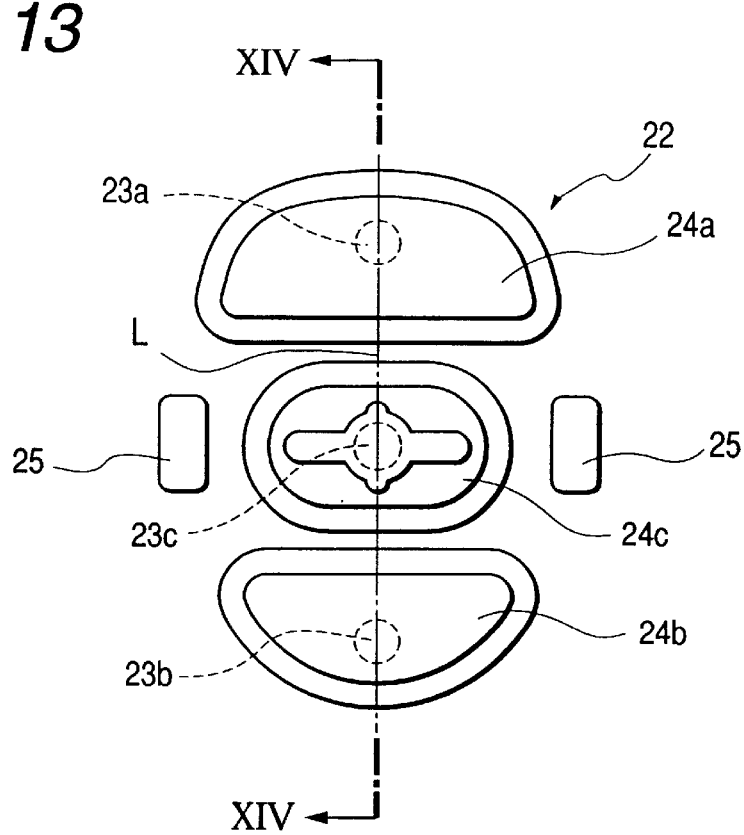
FIG. 13 is a plan view showing a rubber key employed in the present invention.
Figure 14:
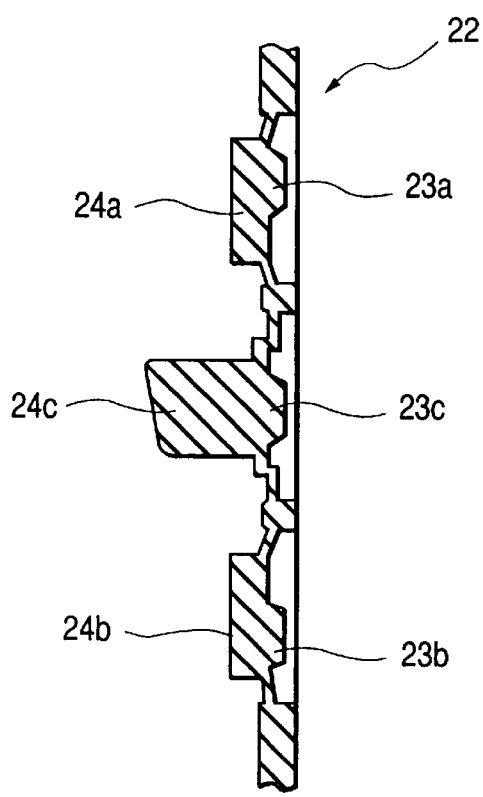
FIG. 14 is a cross-sectional view of the rubber key taken along line XIV—XIV shown in FIG. 13.

Recesses 25 are formed in the upper surface of the rubber key 22 so as become symmetrical with respect to the longitudinal axis L running through the protuberance 24c (see FIGS. 4 and 13).

The multifunction key actuation section 6 is fitted into the hole 4 of the front case 3, and the support pins 6e provided on the lateral sides of the multifunction key actuation section 6 are fitted into the respective pin support holes 5b of the rib 5 formed along the periphery of the hole 4 of the front case 3. Each of the faulty-operation prevention members 6d of the multifunction key actuation section 6 has its lower end fitted into the corresponding recess 25 of the rubber key 22, the bottom surface of which supports the lower end of the faulty-operation prevention member 6d (see FIGS. 1, 2, and 4).

The execution key actuation section 7 is fitted into the hole 8 of the multifunction actuation section 6. The upper surface of the flange 7c of the execution key actuation section 7 engages the lower end of the rib 6c of the multifunction key actuation section 6, and the lower surface of the flange 7c engages the surface of the rubber key 22 (see FIGS. 1, 2, and 4), thus preventing dislodging of the execution key actuation section 7 from the hole 8.

The lower end of the rubber key member 6f of the multifunction key actuation section 6 is brought into contact with the upper surface of the protuberance 24a provided on the rubber key 22, and the lower end of the rubber key member 6g is brought into contact with the upper surface of the protuberance 24b. The protuberance 24c provided on the rubber key 22 is fitted into a space 7d (see FIGS. 11 and 12) defined by the oblong section 7a and the rib 7b of the execution key actuation section 7, and the top of the protuberance 24c is in contact with the reverse side of the oblong section 7a of the execution key actuation section 7 (see FIGS. 2 and 4).

Figure 1:
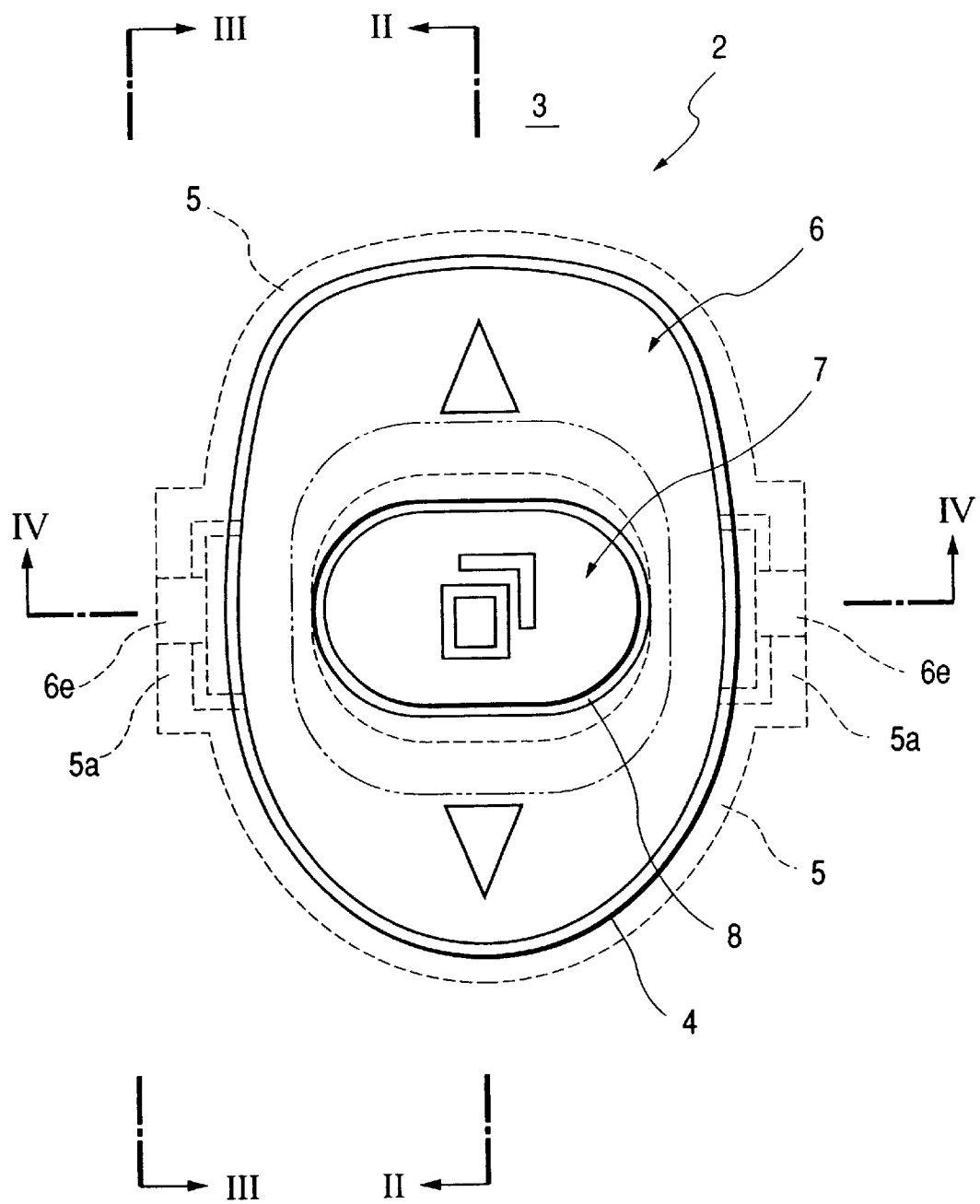
FIG. 1 is a plan view showing a multifunction key for use with a portable device according to the present invention.
Figure 2:
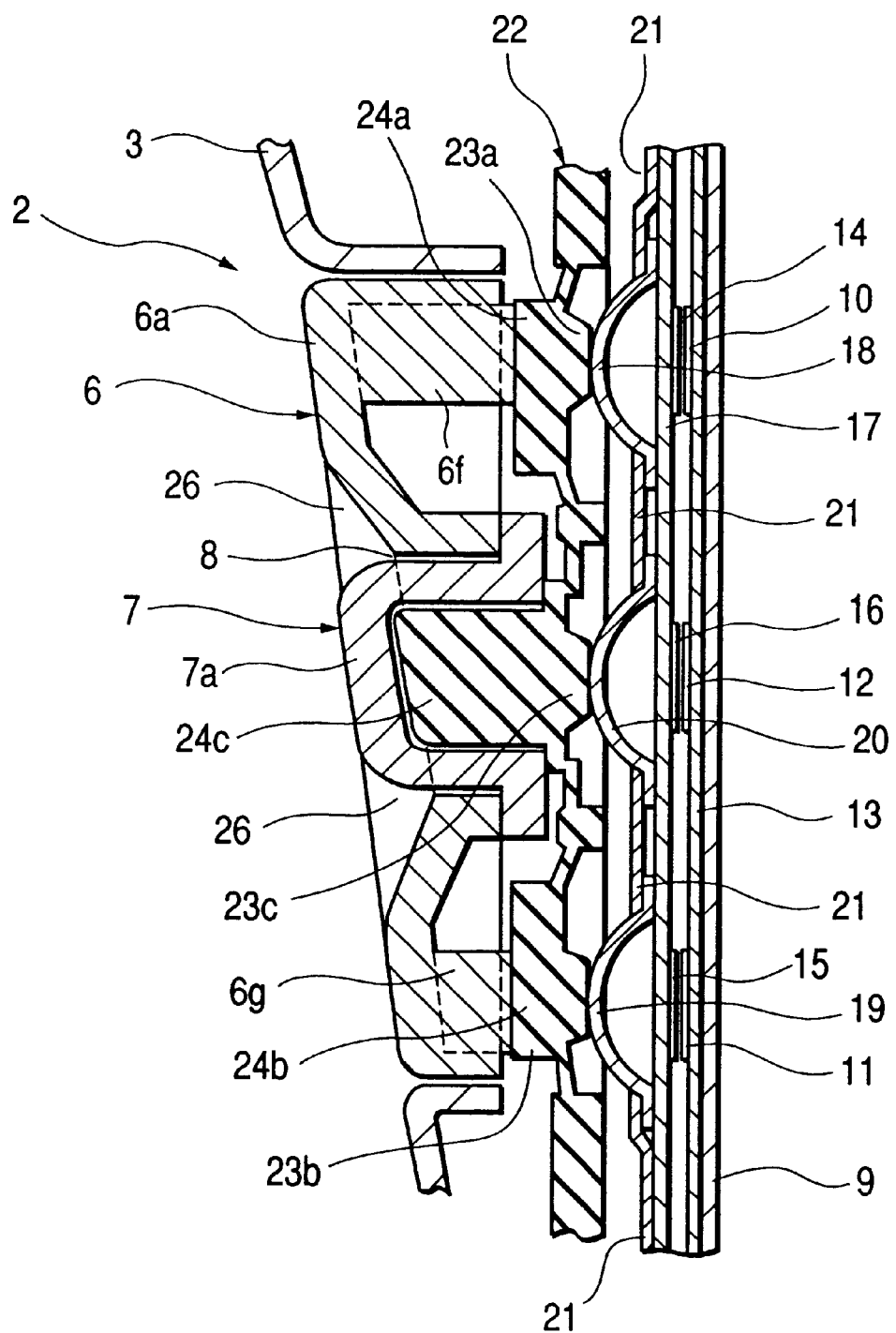
FIG. 2 is a cross-sectional view of the multifunction key taken along line II—II shown in FIG. 1.

A tapered section 26 is formed between the oval section 6a of the multifunction key actuation section 6 and the execution key actuation section 7, to thereby prevent the multifunction key actuation section 6 from being erroneously actuated simultaneously with actuation of the execution key actuation section 7 (see FIG. 2).

The operation of the multifunction key 2 according to the embodiment will now be described.

Figure 3:
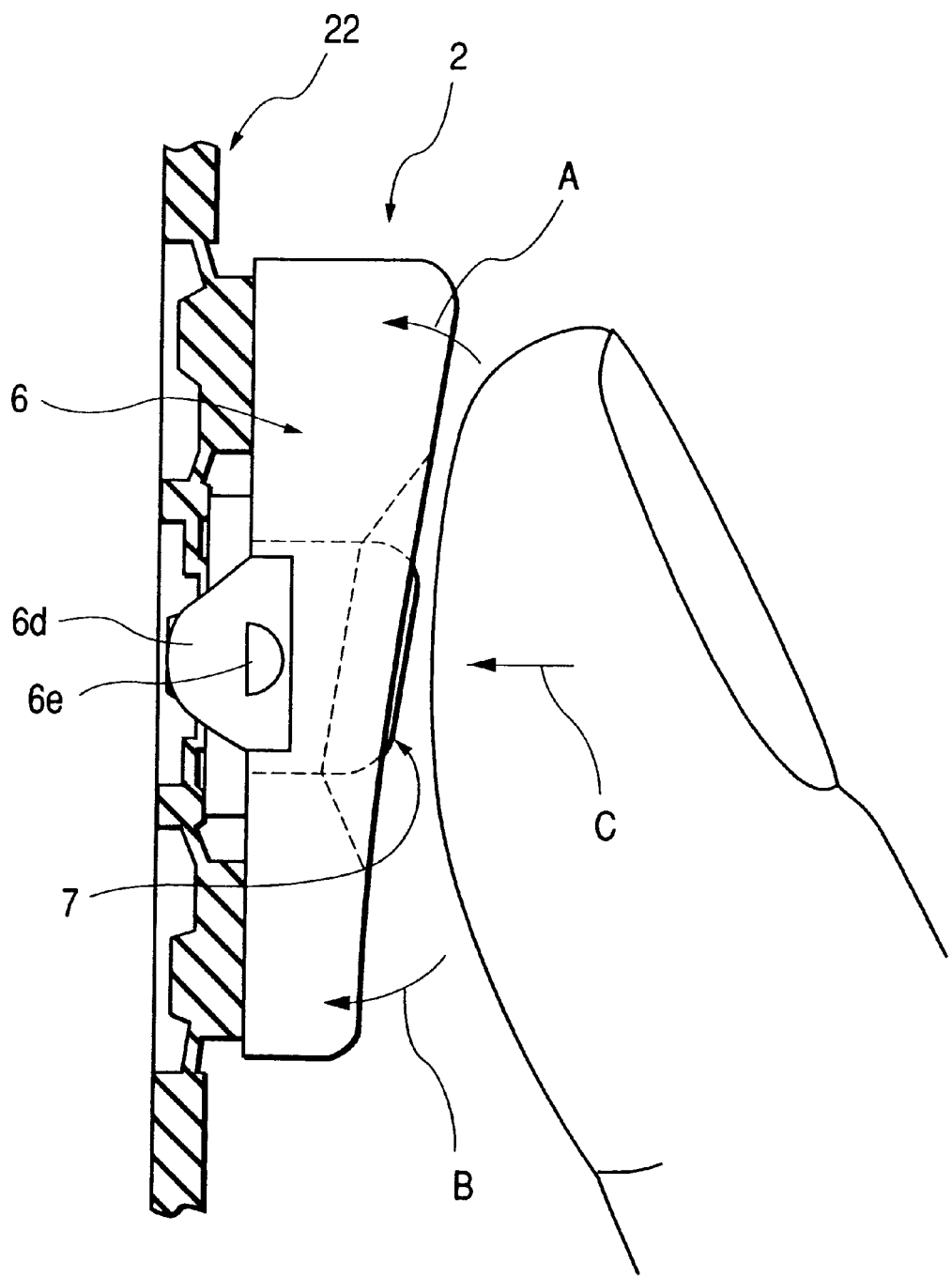
FIG. 3 is a cross-sectional view of the multifunction key taken along line III—III shown in FIG. 1.

The portable cellular phone 1 is activated for use, and the multifunction key actuation section 6 of the multifunction key 2 is actuated. As shown in FIG. 3, the edge of the multifunction key actuation section 6 is pressed in the direction indicated by arrow A by means of the user's finger.

In this case, the multifunction key actuation section 6 is pivoted about the support pint 6e in the direction indicated by arrow A shown in FIG. 3 with reference to the pin support holes 5b formed in the vertical surface 5a of the rib 5.

As a result, the rubber key actuation member 6f of the multifunction key actuation section 6 presses the protuberance 24a of the rubber key 22. The protuberance 23a of the rubber key 22 facing the metal dome 18 presses the metal dome 18 until the metal dome 18 is slightly indented, and in turn the metal dome 18 presses a portion of the switch sheet 17. As a result, the electrode 14 is connected to and brought into electrical connection with the electrode 10, thus enabling entry of a predetermined operation instruction.

An unillustrated elastic space is interposed between the switch sheets 13 and 17. When the force exerted on the edge of the multifunction key actuation section 6 is reduced, the electrodes 10 and 14 are separated from each other under the restoration force of the spacer, thus disconnecting electrical connection and disabling entry of an operation instruction.

As shown in FIG. 3, another edge of the multifunction key actuation section 6 of the multifunction key 2 is actuated in the direction indicated by arrow B.

In this case, the multifunction key actuation section 6 is pivoted about the support pint 6e in the direction indicated by arrow B shown in FIG. 3, with reference to the pin support hole 5b of the vertical surface 5a of the rib 5.

As a result, the rubber key actuation member 6g of the multifunction key actuation section 6 presses the protuberance 24b of the rubber key 22. The protuberance 23b of the rubber key 22 facing the metal dome 19 presses the metal dome 19 until the metal dome 19 is slightly indented, in turn the metal dome 19 presses a portion of the switch sheet 17. As a result, the electrode 15 is connected to and brought into electrical connection with the electrode 11, thus enabling entry of a predetermined operation instruction.

When the force exerted on the edge of the multifunction key actuation section 6 is reduced, the electrodes 11 and 15 are separated from each other under the restoration force of the spacer, thus disconnecting electrical connection and disabling entry of an operation instruction.

In some cases, the execution key actuation section 7 is pressed straight in the direction indicated by arrow C shown in FIG. 3 by means of the finger resting on the multifunction key 2 while the electrodes 10 and 14 or the electrodes 11 and 15 are brought into contact with each other through actuation of the multifunction key actuation section 6. As a result, the protuberance 23c facing the metal dome 20 of the rubber key 22 presses the metal dome 20, so that the metal dome 20 becomes slightly indented. Accordingly, a portion of the switch sheet 17 is pressed, to thereby bring the electrodes 16 and 12 into electrical contact. The operation instruction entered by way of the electrodes 10 and 14 or the electrodes 11 and 15 by means of actuation of the multifunction key actuation section 6 is determined.

In the present embodiment, since the execution key actuation section 7 is formed in the center of the multifunction key actuation section 6, an operation instruction can be entered by actuation of the execution key actuation section 7 without involvement of shift of the finger to another key while the finger is placed on the multifunction key actuation section 6.

Even if the execution key actuation section 7 is touched during the course of actuation of the multifunction key actuation section 6, the metal dome 20 pressed by the execution key actuation section 7 is higher in rigidity than the metal dome 18 or 19 pressed by the multifunction key actuation section 6. Accordingly, a preset pressing force (load) required for deformation of the metal dome 20 is higher than preset pressing force required for deformation of the metal domes 18 and 19, thus preventing faulty actuation of the execution key actuation section 7.

The tapered section 26 is formed in the area of the multifunction key actuation section 6 surrounding the execution key actuation section 7. Consequently, when the execution key actuation section 7 is pressed, the finger will not touch the multifunction key actuation section 6.

Even if the finger touches the multifunction key actuation section 6 at the time of pressing of the execution key actuation section 7, and the multifunction key actuation section 6 is pressed in either the direction A or the direction B shown in FIG. 3, the edge of the faulty-operation prevention member 6*d* of the multifunction key actuation section 6 is brought into contact with one of the recesses 25 of the rubber key 22. Since the rubber key 22 is supported on the substrate 9, the multifunction key actuation section 7 is prevented from being pressed in either the direction A or B shown in FIG. 3, thus preventing faulty actuation of the multifunction key actuation section 6.

Consequently, the operability of the portable cellular phone 1 according to the present embodiment is improved.

Although the embodiment has described a case where a multifunction key applies to a portable cellular phone, it goes without saying that the multifunction key is not limited to the portable cellular phone but can be applied to another types of various portable devices such as a personal handyphone system or a cordless telephone, and to a portable audio device such as a CD player or a portable radio receiver, and a portable game machine. The embodiment of the present invention can be subjected to various modifications within the scope of the present invention.

A multifunction key for use with a portable device according to the present invention eliminates a necessity for actuating another key spaced apart from the multifunction key in order to execute an operation instruction and can prevent a faulty operation, thus yielding an advantage of improved operability of the portable device.

What is claimed is:

1. A multifunction key for use with a portable device comprising:

a case having a hole formed therein;

a multifunction key actuation section which is fitted into the hole and is pivotally movable in a thicknesswise direction of the case, to input a plurality of different operation instructions;

another hole formed so as to penetrate through the multifunction key actuation section in the thicknesswise direction of the case;

an execution key actuation section which is fitted into the latter hole and determines the operation instruction entered by way of the multifunction key actuation section when being pressed in the thicknesswise direction of the case; and wherein projecting faulty-operation prevention members are formed at respective areas where support pins for pivotally supporting the multifunction key actuation section are provided, and when the execution key actuation section is pressed in the thicknesswise direction of the case, the faulty-operation prevention members prevent the multifunction key actuation section from being pressed in the thicknesswise direction of the case.

2. The multifunction key as defined in claims 1, wherein a tapered section is formed in the multifunction key actuation section into which the execution key actuation section is fitted, to thereby prevent the user's finger from touching the multifunction key actuation section during the course of actuation of the execution key actuation section.

3. The multifunction as defined in claim 1, wherein pressing force required for actuation of a metal dome by way of a rubber key when the execution key actuation section is pressed in the thicknesswise direction of the case is set so as to become greater than pressing force required for actuation of metal domes by way of the rubber key when the multifunction key actuation section is pressed in the thicknesswise direction of the case.

4. A multifunction key for use with a portable device comprising:

a case having a hole formed therein;

a multifunction key actuation section which is fitted into the hole and is pivotally movable in a thicknesswise direction of the case, to input a plurality of different operation instructions;

another hole formed so as to penetrate through the multifunction key actuation section in the thicknesswise direction of the case;

an execution key actuation section which is fitted into the latter hole and determines the operation instruction entered by way of the multifunction key actuation section when being pressed in the thicknesswise direction of the case; and wherein pressing force required for actuation of a metal dome by way of a rubber key when the execution key actuation section is pressed in the thicknesswise direction of the case is set so as to become greater then pressing force required for actuation of metal domes by way of the rubber key when the multifunction key actuation section is pressed in the thicknesswise direction of the case.

5. The multifunction key as defined in claim 4, wherein a tapered section is formed in the multifunction key actuation section into which the execution key actuation section is fitted, to thereby prevent the user's finger from touching the multifunction key actuation section during the courts of actuation of the execution key actuation section.

6. The multifunction key as defined in claim 5, wherein projecting faulty-operation prevention members are formed at respective areas where support pins for pivotally supporting the multifunction key actuation section are provided, and when the execution key actuation section is pressed in the thicknesswise direction of the case, the faulty-operation prevention members prevent the multifunction key actuation section from being pressed in the thicknesswise direction of the case.

* * * * *